2,905,710

PROCESS FOR PRODUCING GLUTAMIC ACID

Tetsuo Ogawa, Tokyo, Isamu Komori and Jukuro Kawaoka, Kawasaki City, Akio Ishiwata, Tokyo, and Yukitoshi Fujiyama, Kawasaki City, Japan, assignors to Ajinomoto Co., Inc., Kawasaki City, Japan No Drawing. Application March 21, 1957
Serial No. 647,492

5 Claims. (Cl. 260—527)

The present invention concerns a process for producing glutamic acid from beet sugar molasses or waste liquor thereof after recovering either sugar or alcohol therefrom such as "Steffen's filtrate," "aqua madre" or "vinasse," and more particularly refers to a new process for obtaining glutamic acid from said raw materials at decided advantages.

It is among the objects of this invention to obtain glutamic acid with higher yield from said molasses or waste liquors thereof.

Another object is to obtain glutamic acid in higher purity from said molasses or wastes thereof.

A further object is to facilitate crystallization of glutamic acid from the solution treated.

Yet another object is to reduce the necessary amount of acid, alkali, decolorizing carbon or the like and, accordingly, the cost for producing glutamic acid from said beet sugar molasses or the wastes thereof.

Other objects will become apparent from the following specification and claims.

Heretofore, glutamic acid has been manufactured industrially by hydrolyzing proteins contained in wheat, corn, soy-bean and the like. Rapid advance has been made in recent years in the industrial production of glutamic acid, either by synthesis or from natural raw materials.

It has been found that there exists glutamic acid in beet sugar molasses and wastes thereof, for the most part in the form of potassium salt of pyroglutamic acid, which may be considered as formed due to dehydration and ring-closure in the molecule of glutamic acid, together with such other various ingredients as potassium, calcium or other salts of organic acids, other amino acids, betaine, etc. In one known process, pyroglutamic acid in beet sugar molasses or wastes thereof is hydrolyzed by use of hydrochloric acid, converted into glutamic acid hydrochloride and finally into glutamic acid. In another process, pyroglutamic acid is hydrolyzed by use of alkali, the pH of the hydrolysate is lowered to 3.2 by the use of acids, after the removal of inorganic salt, and the hydrolysate is directly subjected to crystallization of glutamic acid. In these processes, large amounts of acid and alkali are inevitably consumed in unnecessary hydrolysis of the co-existing ingredients in the treating materials and the obtained products are of low grade in purity.

Considerable difficulty lies in the complete separation of pyroglutamic acid or salts thereof, on the one hand, and the other ingredients, e.g. betaine, other amino acids and other organic acids or salts thereof, on the other hand, because of their closely similar chemical behavior.

We have found that, if an acidified solution of waste of beet sugar molasses is treated with a monohydric aliphatic alcohol containing 4-5 carbon atoms in a molecule such as certain butyl alcohols or amyl alcohols, which is only partially soluble in or miscible with water and which is fully or partially saturated with water to form a two-phase liquid, pyroglutamic acid moves into the alcohol phase while betaine, which is a substance contained in large quantity in beet and accordingly in beet sugar molasses or wastes thereof and which is most difficult to separate from pyroglutamic acid, remains in the water phase. Although other amino acids partly follow the pyroglutamic acid into the alcohol phase, the quantity is remarkably diminished in comparison with the content in the original solution. Such organic acids other than amino acid, volatile and non-volatile, as lactic acid, acetic acid, formic acid, succinic acid etc., have little harmful effect in the crystallization of pure glutamic acid to be carried out in the last step of the procedure.

Addition of water to the monohydric aliphatic alcohol containing 4-5 carbon atoms has a significance in the process in accordance with this invention which is based upon the difference between partition coefficients of pyroglutamic acid and such impurities as betaine in water phase and said alcohol phase. For example, a two-phase liquid containing water and n-butyl alcohol dissolves 18.7 wt. percent of pyroglutamic acid at 10° C. while absolute n-butyl alcohol dissolves only 3.4 wt. percent thereof. Similar relations have been observed between other absolute and two-phase monohydric aliphatic alcohols containing 4-5 carbon atoms, as listed below (right column shows percent of alcohol in solution saturated with water):

| | W./w. percent |
|---|---|
| n-Butyl alcohol | 80 |
| Iso-butyl alcohol | 83.6 |
| Sec.-butyl alcohol | 55.9 |
| n-p-Amyl alcohol | 93 |
| 2-methyl-1-butanol | 93 |
| p-Iso-amyl alcohol | 93 |
| 3-methyl-2-butanol | 93 |
| Neopentyl alcohol | 91.5 |
| n-Sec.-amyl alcohol | 91.5 |
| Sec.-iso-amyl alcohol | 92 |
| Tert.-amyl alcohol | 82.5 |

All the above alcohols, fully or nearly saturated with water, may be used in processes in accordance with this invention. Fusel oil is also useful in this invention. Such alcohols as are useful in processes in accordance with this invention will be hereinafter called merely "water-containing monohydric aliphatic alcohol."

The present invention is applicable either to "Steffen's filtrate," i.e. the waste liquor of beet sugar molasses wherefrom the sugar content has been recovered by Ca-process, or to "aqua madre," i.e. the similar waste liquor after recovering of beet sugar by Ba-process. This invention is also applicable to "vinasse," i.e. the waste liquor of beet sugar molasses which has been utilized to alcoholic fermentation. There is no essential difference between said molasses and waste thereof in regard to such ingredients as pyroglutamic acid, betaine, other amino acids and other organic acids. For the sake of simplicity, such available wastes in general will be hereinafter called merely "beet sugar molasses waste."

According to the present invention, beet sugar molasses waste containing pyroglutamate together with the aforesaid miscellaneous ingredients, e.g. potassium, calcium and other salts of organic acids, other amino acids, and betaine is rendered acidic by the addition of sulfuric acid, hydrochloric acid or the like, preferably to a pH of 1.0–2.0, to make all above said salts free and then, after removing the precipitates, extracted with a water-containing monohydric aliphatic alcohol. Counter current multi-stage extraction may be adopted in industrial operations. Betaine and a major amount of other amino acids remain in aqueous solution, together with other impurities, such as alkali and alkali earth salts of the added mineral acid, while pyroglutamic acid moves into the alcohol solution together with a minor quantity of amino acids, other than betaine, and organic acids containing no nitrogen atom. It will be easily understood that, when said alcoholic solution is contacted with water or an aqueous solution of alkali, pyroglutamic acid and minor impurities contained in the original alcoholic solution naturally move into the aqueous phase, because all such substances have been contained in the aqueous solution before said extraction with said alcohol. The separated alcohol phase therefore has little impurity and may be used in the next extraction without the need of distillation. The separated aqueous solution, still containing pyroglutamic acid together with minor quantities of other acids as last mentioned, is subjected to hydrolysis by means of alkali or mineral acid to change pyroglutamic acid into glutamic acid. The solution is concentrated and its pH is adjusted to about 3.2 by adding mineral acid or alkali, from which solution glutamic acid crystallizes in purer state and with higher yield than in other known processes (see Example 1).

In order to obtain glutamic acid in still purer state and with still higher yield, the above said solution subjected to hydrolysis may be extracted again with the water-added monohydric aliphatic alcohol (see Example 2). Thus, said minor quantities of other amino acids and other organic acids forming impurities of glutamic acid move into the alcohol phase while glutamic acid remains in the water phase, wherefrom glutamic acid crystalizes in much purer state and with much higher yield, leaving such mineral salt as NaCl in the mother liquor. Such re-extraction with the same monohydric aliphatic alcohol serves to minimize extremely the amount of decolorizing carbon required.

When a process for manufacturing glutamic acid from beet sugar molasses or wastes thereof is carried out in accordance with the present invention, necessary amounts of acid and alkali are remarkably diminished owing to the decrease of impurities co-existing with pyroglutamic acid, and crystallization of glutamic acid from the liquor is extraordinarily facilitated, with the result that glutamic acid of higher purity is produced with higher yield.

The waste liquor of the process carried out according to this invention, wherefrom pyroglutamic acid has been selectively removed, may be utilized in the same ways as the originally used liquors and even as food-stuff for cattle and poultry because of complete recovery of used alcohols and, therefore, complete lack of toxic effects.

The following examples illustrate the invention but are not to be construed as limiting the same:

*Example 1*

1 kg. of vinasse, nitrogen content of which is 4.5%, the waste liquor of beet sugar molasses wherefrom sugar had been removed by fermentation, was mixed with 200 g. of concentrated sulfuric acid to adjust the pH of the solution to 1.5. A precipitate consisting mainly of mineral salts such as calcium, potassium and sodium sulfate was separated from said solution. Then, said solution was subjected to counter current multi-stage extraction with 3 kg. of water-containing n-butyl alcohol (82 w./w. percent). About 80 g. of pyroglutamic acid, which amount corresponds to 95 wt. percent thereof originally contained in said vinasse, was found in the alcoholic solution, with a minor amount of amino acids and other organic acids, volatile and non-volatile, e.g. lactic, acetic, formic and succinic acids, while substantially all the amount of betaine contained in said vinasse was found in the aqueous solution together with major quantity of amino acids and mineral salts. 273 g. of aqueous solution containing 40% of caustic soda was contacted with said alcoholic solution, the two phases, alcoholic and aqueous, being separated from each other. The almost colorless alcoholic solution was found to contain only 0.002 wt. percent of total solid matters and could, therefore, be used in the next extraction without subjecting it to distillation. The aqueous solution which contained almost all the quantity of pyroglutamic acid contained in alcoholic solution was concentrated from 880 g. to 630 g. and subjected to hydrolysis by keeping it at elevated temperature, after adding 72 g. of 40% aqueous solution of caustic soda. Said solution was acidified with hydrochloric acid to a pH of 3.2, the isoelectric point of L-glutamic acid, and then left to cool. Pure crystals of glutamic acid weighing 64 g. were obtained. Increase in the yield is about 40% in comparison with 46 g. of glutamic acid crystals obtained in case where the same amount of vinasse is directly subjected to hydrolysis by use of caustic soda, and then glutamic acid is crystallized at its isoelectric point. The required amount of caustic soda was reduced to less than 50% compared with the latter process, the required amount of acid also being accordingly reduced.

*Example 2*

To 500 g. of concentrated Steffen's filtrate, having 4.5% of nitrogen content, concentrated sulfuric acid was added to adjust the pH of the solution to 1.5 and the precipitate was separated as in the fore-going example. The solution was subjected to counter current multi-stage extraction with 2 kg. of water-containing fusel oil. About 37 g. of pyroglutamic acid corresponding to 93 wt. percent thereof originally contained in said Steffen's filtrate was found in the alcoholic solution. 1 kg. of water was contacted with said alcoholic solution, the two phases being separated from each other. The aqueous solution which contained almost all the quantity of pyroglutamic acid contained in said fusel oil solution was concentrated to 420 g. and subjected to hydrolysis by keeping it at elevated temperature after adding 200 g. of 35% hydrochloric acid. Said solution was neutralized with caustic soda and its pH was adjusted to 1.0. Extraction with 1 kg. of water-added fusel oil was again carried out and the pH of the aqueous solution separated therefrom was adjusted to 3.2 for crystallization of glutamic acid. Pure crystals of glutamic acid weighing 34.2 g. were obtained. In comparison with the usual process wherein extraction with said water-added fusel oil according to this invention was not applied, much more increase of the yield was found than in Example 1 and the required amount of acid also is remarkably diminished. Moreover, the required amount of decolorizing carbon for use in this example was reduced to about 5% of that required in Example 1 and was beyond comparison with that required in case where water-containing monohydric aliphatic alcohol was not used in accordance with this invention.

Having now particularly described and ascertained the nature of our said invention and in what manner the same is to be performed, we declare what we claim is:

1. A process for producing glutamic acid from beet sugar molasses waste, comprising the steps of acidifying the molasses waste with a mineral acid to a pH of less than 3.0, subjecting the acidified molasses waste to extraction with a monohydric aliphatic alcohol which is half to fully saturated with water to form a two-phase liquid and which is selected from the group consisting of butyl alcohols, amyl alcohols and mixtures thereof which are only partially soluble in water, separating the alcoholic extract, adding water to the alcoholic extract whereby the extracted substances move into aqueous phase, recovering the alcohol, hydrolyzing the aqueous phase to convert pyroglutamic acid contained therein into glutamic acid, and subjecting the aqueous phase to crystallization of glutamic acid.

2. The process of claim 1, wherein an alkaline substance selected from the group consisting of alkali and alkali earth metal hydroxides is dissolved in the water before it is added to the alcoholic extract.

3. The process of claim 1, wherein said hydrolyzed aqueous phase is again subjected to extraction with said two-phase alcoholic liquid, the aqueous phase of said extraction is separated from the alcoholic phase and the aqueous phase is subjected to crystallization of glutamic acid.

4. The process of claim 1, wherein said extraction is a counter current, multi-stage extraction.

5. The process of claim 1, wherein said alcohol is fusel oil.

References Cited in the file of this patent

UNITED STATES PATENTS

| | | |
|---|---|---|
| 2,434,715 | Olcott et al. | Jan. 20, 1948 |
| 2,706,737 | Cardinal | Apr. 19, 1955 |
| 2,738,353 | Blish | Mar. 13, 1956 |